US007784855B2

United States Patent
Faass et al.

(10) Patent No.: US 7,784,855 B2
(45) Date of Patent: Aug. 31, 2010

(54) DEVICE FOR INSTALLING A SENSOR

(75) Inventors: Manfred Faass, Pfinztal (DE); Olaf Jordanek, Wimsheim (DE); Rebecca Talmon L'Armee, Althengstett-Neuhengstett (DE)

(73) Assignee: Robert Bosch GmbH, Stuttgart (DE)

( * ) Notice: Subject to any disclaimer, the term of this patent is extended or adjusted under 35 U.S.C. 154(b) by 488 days.

(21) Appl. No.: 11/632,585

(22) PCT Filed: Jun. 8, 2005

(86) PCT No.: PCT/EP2005/052634
§ 371 (c)(1),
(2), (4) Date: Jan. 14, 2008

(87) PCT Pub. No.: WO2006/013127
PCT Pub. Date: Feb. 9, 2006

(65) Prior Publication Data
US 2008/0290672 A1 Nov. 27, 2008

(30) Foreign Application Priority Data
Jul. 31, 2004 (DE) ...................... 10 2004 037 257

(51) Int. Cl.
*B60R 11/00* (2006.01)
*B60R 19/48* (2006.01)
(52) U.S. Cl. .................. 296/187.01; 293/117; 361/807; 340/435; 340/436
(58) Field of Classification Search ................ 296/102, 296/117; 73/431, 632, 866.5, 629; 361/807; 340/435, 436; 293/102, 117
See application file for complete search history.

(56) References Cited

U.S. PATENT DOCUMENTS

| 5,844,471 | A  | * | 12/1998 | Daniel ........................ 340/436 |
| 6,085,592 | A  | * | 7/2000  | Kawashima ................. 73/632 |
| 6,203,366 | B1 | * | 3/2001  | Muller et al. ............... 439/561 |
| 6,282,969 | B1 | * | 9/2001  | Daniel ....................... 73/866.1 |
| 6,572,161 | B2 | * | 6/2003  | Wild et al. .................. 293/117 |
| 6,759,950 | B2 | * | 7/2004  | Nishimoto et al. .......... 340/436 |
| 6,839,943 | B2 | * | 1/2005  | Burkhardt et al. ............ 24/458 |

(Continued)

FOREIGN PATENT DOCUMENTS

DE 196 13 803 10/1997

(Continued)

OTHER PUBLICATIONS

Patent Abstracts of Japan, Bd, 2002, Nr. 11, Nov. 6, 2002 & JP 2002 195225 A (Niles Parts Co., Ltd.), Jul. 10, 2002.

*Primary Examiner*—Jason S Morrow
(74) *Attorney, Agent, or Firm*—Kenyon & Kenyon LLP

(57) ABSTRACT

An installation device for a sensor on an outer surface of a component of a motor vehicle includes the following elements: a base member for accommodating the sensor; holding brackets for fastening the sensor to the base member; a contour ring for accommodating the base member and for attaching the base member to the component of the motor vehicle; tabs for fastening the base member to the contour ring; and spring elements for retaining the base member and contour ring on the component of the motor vehicle with force locking, the base member having a first rigid region and a second elastic region, and the contour ring being provided at an opening in the component of the motor vehicle.

20 Claims, 3 Drawing Sheets

U.S. PATENT DOCUMENTS

| | | | | |
|---|---|---|---|---|
| 6,902,215 | B1* | 6/2005 | Condeelis | 293/117 |
| 7,084,744 | B2* | 8/2006 | Li | 340/435 |
| 7,357,431 | B2* | 4/2008 | Sato et al. | 293/117 |
| 7,384,082 | B2* | 6/2008 | Blake | 293/117 |
| 7,398,687 | B2* | 7/2008 | Nakajima et al. | 73/661 |
| 7,435,092 | B2* | 10/2008 | Grant | 439/34 |
| 7,591,182 | B2* | 9/2009 | Sato et al. | 73/649 |
| 7,613,013 | B2* | 11/2009 | Gau | 361/810 |
| 7,616,102 | B2* | 11/2009 | Kudelko et al. | 340/435 |
| 2002/0130770 | A1* | 9/2002 | Keyworth et al. | 340/436 |
| 2004/0061599 | A1* | 4/2004 | Li | 340/435 |
| 2005/0242933 | A1* | 11/2005 | Loh | 340/435 |
| 2009/0013782 | A1* | 1/2009 | Theml et al. | 73/431 |
| 2009/0302712 | A1* | 12/2009 | Ota | 310/334 |

FOREIGN PATENT DOCUMENTS

| | | |
|---|---|---|
| DE | 196 21 964 | 12/1997 |
| DE | 196 26 291 | 1/1998 |
| DE | 199 39 747 | 3/2001 |

\* cited by examiner

DEVICE FOR INSTALLING A SENSOR

FIELD OF THE INVENTION

The present invention relates to a device for installing a sensor on an outer surface of a component of a motor vehicle.

BACKGROUND INFORMATION

Distance sensors, e.g., for measuring distance to the vehicle in front or for parking, are usually mounted on an outer surface of a motor-vehicle component, for instance, on a bumper, using different installation devices. Three components are usually necessary for that purpose: an installation housing for the sensor, a contour ring and a spring element. The installation housing forms the mounting support for the sensor. The angular position of the sensor in the component, i.e., the bumper, of the motor vehicle is made possible by the contour ring, which also forms the adaptation to the contour of the bumper. Thus, different bumper contours require many different contour rings. The spring forms the fixation of the installation device in the bumper. Therefore, a large number of parts is necessary for many fields of application.

Published German patent document DE 196 21 964 describes an attachment according to the related art as a device for the location-variable attachment of a holder on a receiving part. In that case, a certain contour, stipulated beforehand, is necessary in the component or receiving part of the motor vehicle. A holder having a corresponding shape is inserted into it and fixed in position by a further component, a specially formed spring element.

Published German patent document DE 196 26 291 describes an attachment sleeve for ultrasonic transformers having self-locking attachment. This sleeve is inserted from outside through the receiving part or the bumper of the motor vehicle into a corresponding opening, and latched to it by retaining lips. By introducing a sensor, the retaining lips are additionally pressed outwards and secured. Different attachment sleeves are necessary for different thicknesses of the receiving parts.

SUMMARY

The device of the present invention has the advantage that the mounting support of the sensor and the fixation or localization in the component of the vehicle are accomplished by only one component.

The installation device according to the present invention has a contour ring and a base member, the base member being made up of two regions. A rigid region accommodates and fixes the sensor in place in the base member, and accomplishes the attachment to the contour ring which is introduced into the vehicle component, and a second flexible or elastic region fixes the installation device in place in the component of the motor vehicle.

The device of the present invention for installing a sensor on an outer surface of a component of a motor vehicle includes, more specifically, the following:

a base member for accommodating the sensor;

holding brackets for fastening the sensor to the base member;

a contour ring for accommodating the base member and for attaching the base member to the component of the motor vehicle;

tabs for fastening the base member to the contour ring; and spring elements for retaining the base member and the contour ring on the component of the motor vehicle with force locking.

The device according to the present invention is characterized in that the base member has a first rigid region and a second elastic region, and that the contour ring is provided at an opening in the particular intended component. The base member having two regions yields an advantageous reduction in the multiplicity of parts and an economical installation. The contour ring is able to be adapted to any shape of the particular intended component, while the base member always remains unchanged. The contour ring may be both a constituent of the particular intended component, which means the range of components having an existing contour ring is covered, and may be designed as an independent part having a large adaptation spectrum for different components. To that end, a further example refinement provides that the contour ring is introduced from outside through the opening in the particular intended component.

The first rigid region of the base member is designed with a sensor receptacle and holding brackets for accommodating the sensor and with the tabs for the introduction and fixation in the contour ring; the second elastic region has the spring elements and is joined in one piece to the first rigid region via connecting segments. The fact that the base member is in one piece thus advantageously saves on an additional spring element, as well as the work for installing it.

It is expedient that the tabs are flexible compared to the base member, recesses being introduced below them in the base member for their spring excursion toward the longitudinal axis of the base member. In this manner, the rigid tabs can also be designed with a suitable degree of flexibility in the rigid region of the base member, so that additional elastic elements for this purpose may be omitted.

At their end opposite the end joined to the connecting segment, the tabs have slants with a first taper angle and edges that point toward the connecting segment and have respective undercuts, these edges pointing radially away from the longitudinal axis of the base member; the contour ring has a collar at one end and openings, corresponding to the end sections of the tabs, in its section opposite the collar. Thus, advantageously, the base member may easily be fastened in position by the tabs which engage in corresponding openings in the contour ring. The openings in the contour ring may be situated at different positions, thereby advantageously permitting various positions of the base member with the sensor accommodated therein, the base member remaining the same, but the motor-vehicle components varying. Moreover, a suitable formation of the taper angle makes it possible to advantageously adjust the stiffness of different materials for the engagement process of the tabs.

In one example embodiment, the spring elements have a front side and a back side which form a hollow space for accommodating the spring excursion of the front side, in each case one end of the back side being joined to a tab and the base member, respectively. An advantageously simple implementation of the second elastic region of the base member thus becomes possible, thereby achieving a reduction in components.

In a further example embodiment, the front side of the spring element has a reinforcement tab at its free end for the uniform contact fit of the front side of the respective spring element, the reinforcement tab being bent at the inner side of the motor-vehicle component into the hollow space. The front side of the spring element thereby advantageously rests uniformly against the component from inside, and can thus advantageously adapt the installation device to different installation situations.

It is advantageous that at its lower side, the reinforcement tab have a slant with a second taper angle, since on one hand, the contact against the component is thereby advantageously further improved, and on the other hand, the mounting of the base member on the contour ring is advantageously facilitated due to the slant of the reinforcement tab.

The spring elements and tabs are situated so that they are rotated by 90° about the longitudinal axis of the base member in relation to the holding brackets, thereby advantageously yielding a compact design of the base member.

In one example embodiment, the base member having the first rigid region and the second elastic region is produced from a plastic material in common, using an injection molding process. This permits an advantageously cost-effective construction.

In another example embodiment, the base member having the first rigid region and having the second elastic region made of a two-component material is produced using an injection molding process. In this case, an advantageous construction of the different region is also possible in an injection-molding die.

Thus, using the installation device of the present invention, the multiplicity of components is reduced advantageously by integration of components in the base member, and existing components such as the contour ring can continue to be used.

The mounting support of the sensor and the fixation in the component of a motor vehicle are accomplished by only one part. All installation geometries (different bumper thicknesses, setting angle, etc.) can be realized using only one part. A defined seat of the installation device in the axial direction is ensured, since the spring together with the base member in one position on the contour ring permits the fixation. The handling expenditure necessary is advantageously lower due to the smaller number of components compared to the related art. In addition, a defined mounting process is made possible.

BRIEF DESCRIPTIONS OF THE DRAWINGS

DETAILED DESCRIPTION

Distance sensors on outer surfaces of motor vehicles are in the form of familiar ultrasonic sensors, for example. They are usually attached in the bumpers on the front and back of the vehicle; other mounting locations are likewise possible.

Figure 1:
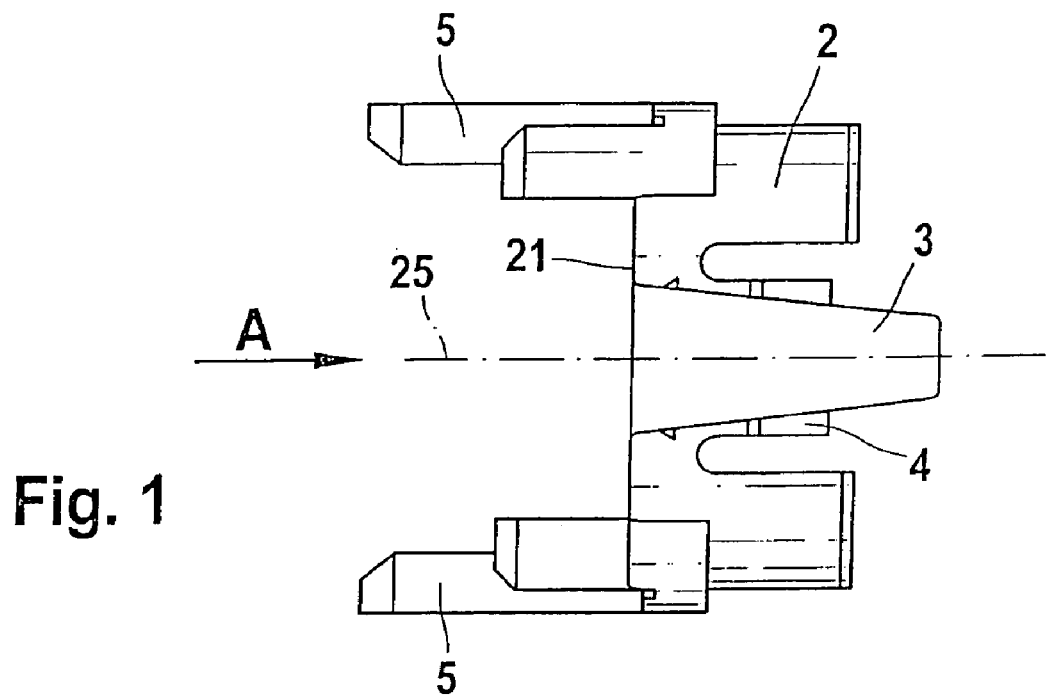
FIG. 1 shows a side view of a base member of an installation device according to the present invention.

These sensors are attached by a device to the particular intended component of a motor vehicle. FIG. 1 shows a side view of an exemplary embodiment of a base member 2 of an installation device 1 according to the present invention (see also FIG. 6) for a sensor that is provided for installation in a component of a motor vehicle.

In this embodiment, base member 2 is circular and has a first region that is rigid. This first region has an inner circular sensor receptacle 22 (FIG. 2) between two holding brackets 5 mounted on it, the holding brackets being situated opposite each other on the back side of base member 2 in extension of its outer surface toward the back side. As is apparent from FIG. 1, the sensor (not shown) is introduced from left to right into base member 2 along its longitudinal axis 25 into this essentially rigid region, and located in position in known manner by the holding brackets. In so doing, base member 2 with its back side forms a stop 21 for a stop collar of the sensor.

Figure 6:
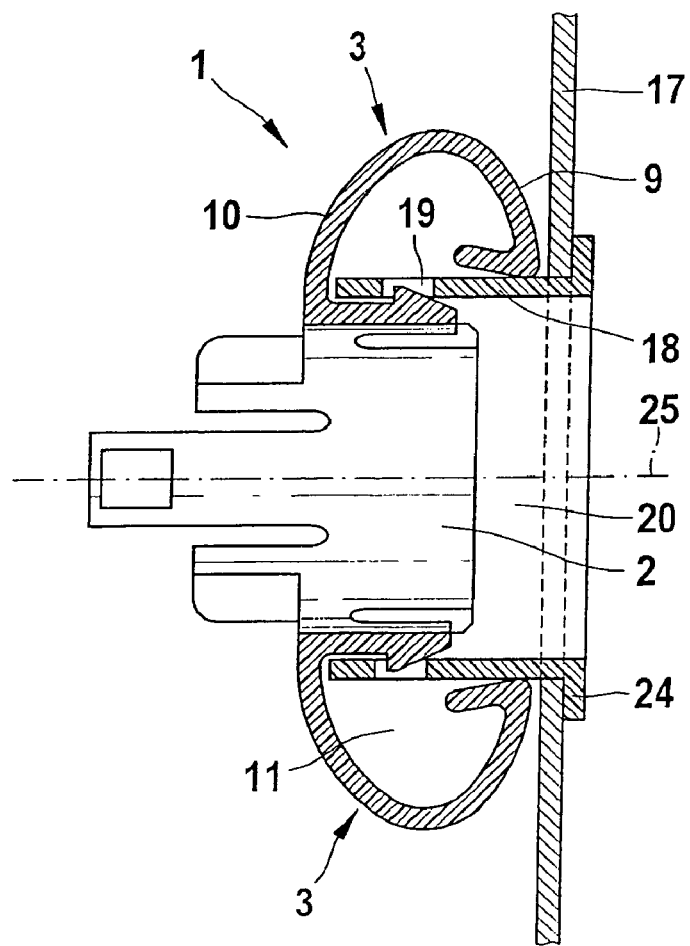
FIG. 6 shows a side view in sectional representation of an exemplary embodiment of the installation device according to the present invention.

The first rigid region of base member 2 is accommodated with the outside of sensor receptacle 22 (FIG. 2) in a contour ring 18 (see FIG. 6). For fastening on contour ring 18 (FIG. 6) on the component of the motor vehicle, in this exemplary embodiment, base member 2 has tabs 4 situated opposite each other on the outer surface of base member 2. In addition to its rigid region, base member 2 has an elastic region having two spring elements 3, which in each case are mounted above tabs 4.

Spring elements 3, together with tabs 4, point toward the front side of base member 2 and are rotated by 90° about longitudinal axis 25 of base member 2 in relation to back-side holding brackets 5.

Figure 2:
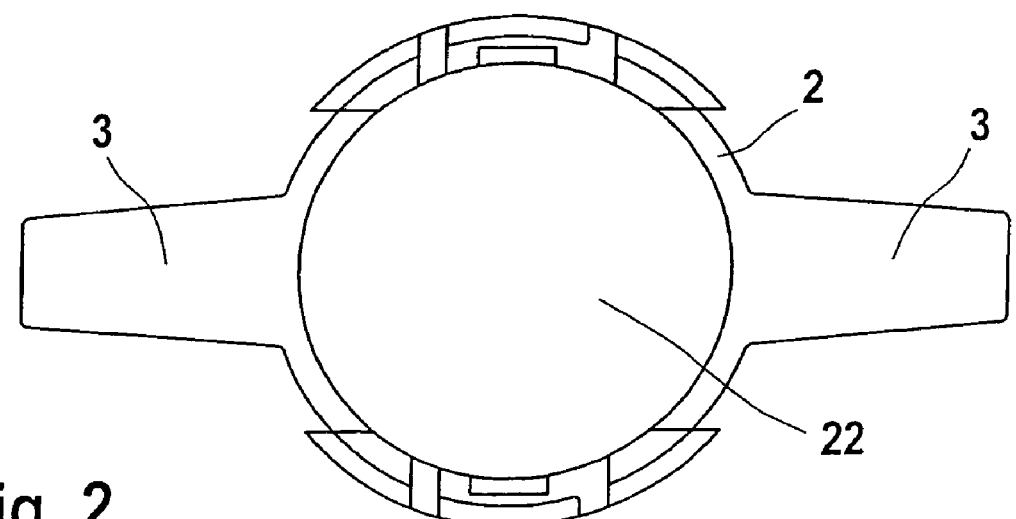
FIG. 2 shows a view in direction A of the base member of the installation device according to FIG. 1.

FIG. 2 shows a view of base member 2 in viewing direction A according to FIG. 1. Here, it can be seen that spring elements 3 extend radially outwards from the center of base member 2. In this example, the length of the radial extension of spring elements 3 has approximately the dimension of the radius of base member 2.

Figure 3:
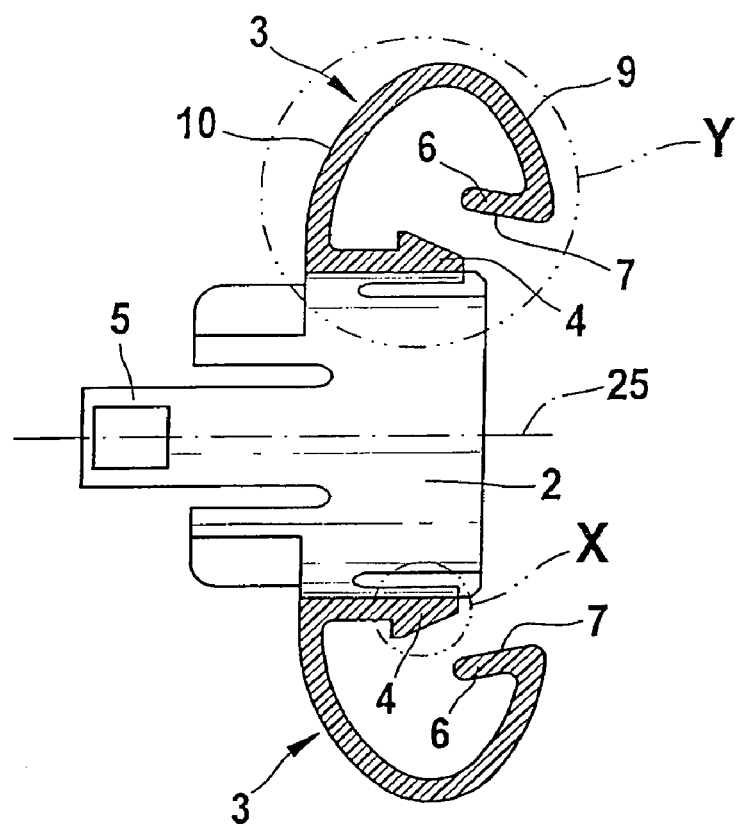
FIG. 3 shows a longitudinal-section view of the base member according to FIG. 1 rotated by 90°.

FIG. 3 shows a longitudinal-section view of the base member according to FIG. 1, base member 2 being rotated by 90° about its longitudinal axis 25.

Spring element 3 has a front side 9 and a back side 10, the lower end of front side 9 being bent over toward the back and forming a reinforcement tab 6. In its upper segment, the shape of the cross-section of spring element 3 is similar to a segment of an ellipse. The lower segment of back side 10 of spring element 3 is connected via a connecting segment 12 to tab 4 and base member 2, as is shown by the enlarged sectional view of this detail Y in FIG. 5 and will be described in greater detail.

Tab 4 runs parallel to longitudinal axis 25 of base member 2 and is connected to base member 2 via connecting segment 12, and to back side 10 of spring element 3. Between tab 4 and base member 2, a recess 16 extends from connecting segment 12 up to the end of tab 4 pointing to the front, as is shown by the enlarged sectional view of this detail portion X in FIG. 4.

Figure 4:
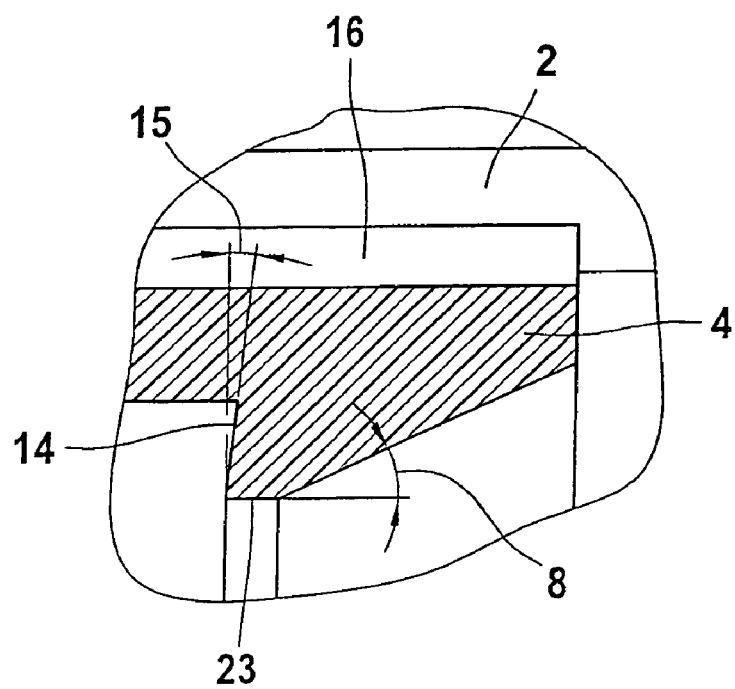
FIG. 4 shows an enlarged sectional view of portion X from FIG. 3.

FIG. 4 shows the front-side end of tab 4, which is situated opposite connecting segment 12, and has a slant having a first taper angle 8 which is approximately 25° in this embodiment. The thickness of the slant increases as it runs toward the rear, where it changes into a short flattened region 23 that runs parallel to longitudinal axis 25 of base member 2.

With its back-side end, flattened region 23 forms an edge that has an undercut 14 having an undercut angle 15, here in this example, preferably being in the range of approximately 5°.

Tab 4, with its back-side end in connecting segment 12, is mounted on base member 2 in a manner allowing a certain degree of flexibility. Its spring excursion toward longitudinal axis 25 of base member 2 is made possible by recess 16.

Figure 5:
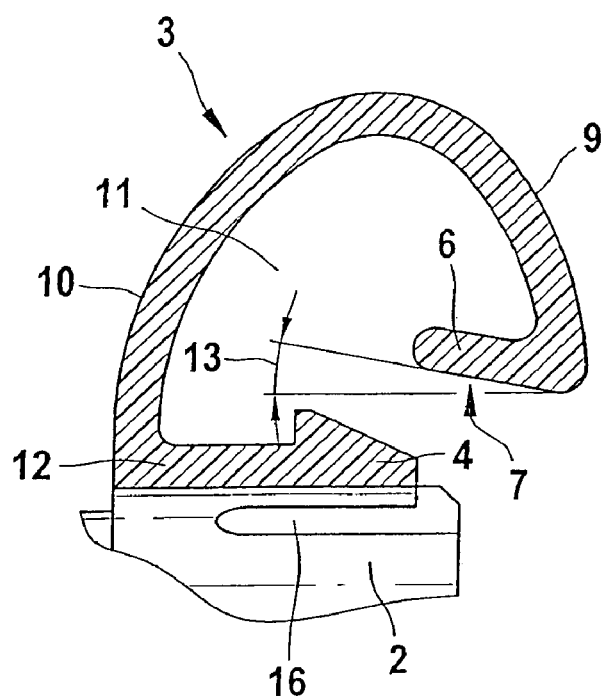
FIG. 5 shows an enlarged sectional view of portion Y from FIG. 3.

Back side 10 of spring element 3 is likewise elastically joined to connecting segment 12, spring element 3 shown enlarged in FIG. 5 being flexible, and a hollow space 11 being situated between front side 9 and back side 10. Front side 9 is able to deflect into this hollow space 11. In this embodiment, front side 9 is situated in such a way that it is located at a distance in front of the front end of base member 2. The spring action or spring excursion can be influenced by this distance and the material of this spring element 3, so that spring constants of different strengths also become possible.

Reinforcement tab 6 is bent over toward the rear into hollow space 11; the reinforcement tab, together with a parallel to longitudinal axis 25 of base member 2, forms a second taper angle 13 having a slant 7. Reinforcement tab 6 is used for the uniform resting and fit of front side 9 of spring element 3 in the installed state, which is shown in FIG. 6. Slant 7 has a further advantageous function to facilitate the installation of base member 2 into or via contour ring 18.

FIG. 6 shows an exemplary installed state of installation device 1 of the present invention in a component of a motor vehicle. Here, for example, this component is a bumper 17 which has an installation opening 20 into which a contour ring 18 having a collar 24 abutting outside against bumper 17 is introduced from the outside on the right in FIG. 6.

For example, this contour ring 18 is cylindrical, and in its rear section situated inside in bumper 17, has openings 19 which correspond in shape and dimension to the end sections of tabs 4. Contour ring 18 is known, and has an inside diameter corresponding to the outside diameter of base member 2 of installation device 1.

During installation, base member 2 is inserted from the inside of bumper 17 into contour ring 18; tabs 4 are initially pushed in the direction of longitudinal axis 25 of base member 2, since a force is applied to their slants by the wall of contour ring 18. Base member 2 is now pushed further in the direction of its longitudinal axis 25 into contour ring 18, until the end sections of tabs 4 snap into corresponding openings 19 in the wall of contour ring 18.

At the same time, spring elements 3 are compressed by contact of their front sides 9 against the inner side of bumper 17, so that in each case, front side 9 and reinforcement tab 6 are moved toward back side 10 as a function of the contour of the inner side of bumper 17, and are shifted into hollow space 11 accordingly.

Reinforcement tab 6 permits this contact fit of respective front side 9 to be uniform.

Due to the compression of front side 9 and back side 10, they are deformed and under tension because of their elasticity, whereby an axial force is generated in the longitudinal direction of longitudinal axis 25 of base member 2, which, via the undercut edges of the end sections of the tabs engaged in openings 19, acts upon contour ring 18 in the direction of its longitudinal axis and of longitudinal axis 25 of base member 2 into bumper 17. In this manner, contour ring 18 and base member 2, mounted from the rear, remain attached with force locking in relation to bumper 17. Twisting can be prevented by known means such as a detent and the like between contour ring 18 and bumper 17.

Contour ring 18 may be variably adapted to the outer contour of bumper 17. It is thereby possible to cover a wide range of application using different contour rings 18 but the same base members 2. Base member 2 is adapted to the inner side of the particular intended bumper by spring elements 3, which adjust flexibly to the various shapes and always generate the necessary axial retention force for installation device 1.

After installation device 1 has been mounted in bumper 17 of the motor vehicle, a sensor is now introduced from the rear into base member 2 as described above, so that its front side terminates with the outer surface of bumper 17 or of contour ring 18. This is easy to imagine, so the sensor is not shown.

Advantageously, the relative position of the sensor with respect to bumper 17 can easily be permitted by a suitable formation of contour ring 18.

Slants 7 of reinforcement tabs 6 additionally facilitate the mounting of base member 2 on contour ring 18.

In the preferred construction, base member 2, spring elements 3, tabs 4 and holding brackets 5 are produced in one piece as an injection-molded part from a suitable plastic material.

The present invention is not limited to the exemplary embodiments described above, but is modifiable in a variety of ways.

It is conceivable to form tabs 4 as insertion parts made of metal having a sharp edge, which effect a firm connection on contour ring 18.

Contour ring 18 may lap over base member 2, as well, and have noses which engage in base member 2.

It is further conceivable that contour ring 18 is already part of a component of the motor vehicle.

Contour ring 18 and base member 2 may also have different cross-sections, e.g., polygonal cross-sections and the like. Likewise, in each case a plurality of spring elements 3, tabs 4 and holding brackets 5 may be situated on the base member.

In one embodiment of base member 2, spring elements 3 and/or tabs 4 may also be made of a material which has a different spring constant with respect to the material of the base member, in a so-called two-component-material construction, which means that the first rigid region of base member 2 is produced from a rigid material, whereas the second elastic region has an elastic material component which is extruded onto base member 2.

What is claimed is:

1. An installation device for a sensor on an outer surface of a component of a motor vehicle, comprising:
    a base member for accommodating the sensor;
    at least one holding bracket for fastening the sensor to the base member;
    a contour ring for accommodating the base member and for attaching the base member to the component of the motor vehicle;
    at least one tab for fastening the base member to the contour ring; and
    at least one spring element for retaining the base member and the contour ring on the component of the motor vehicle with force locking;
    wherein:
        the base member has a first rigid region and a second elastic region;
        the contour ring is provided at an opening in the component of the motor vehicle;
        the at least one tab is flexible in comparison to the base member; and
        at least one recess is introduced in the base member below the at least one tab to facilitate a spring-action movement of the at least one tab relative to a longitudinal axis of the base member.

2. The installation device as recited in claim 1, wherein the contour ring is introduced from outside into the opening of the component.

3. The installation device as recited in claim 1, wherein the first rigid region of the base member includes a sensor receptacle, the at least one holding bracket, and the at least one tab, the sensor receptacle and the at least one holding bracket accommodating the sensor, and the at least one tab being introduced and fixed in the contour ring, and wherein the second elastic region includes the at least one spring element, and wherein the first rigid region and the second elastic region are joined via at least one connecting segment.

4. An installation device for a sensor on an outer surface of a component of a motor vehicle, comprising:
- a base member for accommodating the sensor;
- at least one holding bracket for fastening the sensor to the base member;
- a contour ring for accommodating the base member and for attaching the base member to the component of the motor vehicle;
- at least one tab for fastening the base member to the contour ring; and
- at least one spring element for retaining the base member and the contour ring on the component of the motor vehicle with force locking;

wherein:
- the base member has a first rigid region and a second elastic region;
- the contour ring is provided at an opening in the component of the motor vehicle;
- the first rigid region of the base member includes a sensor receptacle, the at least one holding bracket, and the at least one tab, the sensor receptacle and the at least one holding bracket accommodating the sensor, and the at least one tab being introduced and fixed in the contour ring;
- the second elastic region includes the at least one spring element;
- the first rigid region and the second elastic region are joined via at least one connecting segment;
- at an end opposite to the end joined to the connecting segment, the at least one tab has an undercut and a slant;
- the slant has a first taper angle and an edge pointing toward the at least one connecting segment;
- an edge of the undercut points radially away from the longitudinal axis of the base member; and
- the contour ring has a collar at one end and at least one opening at an opposite end, the at least one opening corresponding to the end of the at least one tab having the undercut and the slant.

5. An installation device for a sensor on an outer surface of a component of a motor vehicle, comprising:
- a base member for accommodating the sensor;
- at least one holding bracket for fastening the sensor to the base member;
- a contour ring for accommodating the base member and for attaching the base member to the component of the motor vehicle;
- at least one tab for fastening the base member to the contour ring; and
- at least one spring element for retaining the base member and the contour ring on the component of the motor vehicle with force locking;

wherein:
- the base member has a first rigid region and a second elastic region;
- the contour ring is provided at an opening in the component of the motor vehicle;
- the at least one spring element has a front side and a back side which together form a hollow space for accommodating a spring-action movement of the front side; and
- one end of the back side is connected to the at least one tab and the base member.

6. The installation device as recited in claim 5, wherein a free end of the front side of the spring element has a reinforcement tab for facilitating a uniform contact fit of the front side, and wherein the reinforcement tab is positioned at an inner side of the component of the motor vehicle and bent into the hollow space of the at least one spring element.

7. The installation device as recited in claim 6, wherein a lower side of the reinforcement tab defines a slant having a second taper angle.

8. An installation device for a sensor on an outer surface of a component of a motor vehicle, comprising:
- a base member for accommodating the sensor;
- at least one holding bracket for fastening the sensor to the base member;
- a contour ring for accommodating the base member and for attaching the base member to the component of the motor vehicle;
- at least one tab for fastening the base member to the contour ring; and
- at least one spring element for retaining the base member and the contour ring on the component of the motor vehicle with force locking;

wherein:
- the base member has a first rigid region and a second elastic region;
- the contour ring is provided at an opening in the component of the motor vehicle;
- the at least one spring element and the at least one tab are rotated by 90° about a longitudinal axis of the base member in relation to the at least one holding bracket.

9. The installation device as recited in claim 8, wherein the base member having the first rigid region and the second elastic region is an integrated, injection-molded, plastic component.

10. The installation device as recited in claim 8, wherein the base member having the first rigid region and the second elastic region includes two discrete injection-molded components.

11. The installation device as recited in claim 8, wherein:
- the first rigid region of the base member includes a sensor receptacle, the at least one holding bracket, and the at least one tab;
- the sensor receptacle and the at least one holding bracket accommodate the sensor;
- the at least one tab is introduced and fixed in the contour ring;
- the second elastic region includes the at least one spring element; and
- the first rigid region and the second elastic region are joined via at least one connecting segment.

12. The installation device as recited in claim 8, wherein the contour ring is introduced from outside into the opening of the component.

13. The installation device as recited in claim 3, wherein the contour ring is introduced from outside into the opening of the component.

14. The installation device as recited in claim 1, wherein the base member having the first rigid region and the second elastic region is an integrated, injection-molded, plastic component.

15. The installation device as recited in claim 1, wherein the base member having the first rigid region and the second elastic region includes two discrete injection-molded components.

16. The installation device as recited in claim 4, wherein the contour ring is introduced from outside into the opening of the component.

17. The installation device as recited in claim 4, wherein the base member having the first rigid region and the second elastic region is an integrated, injection-molded, plastic component.

18. The installation device as recited in claim 4, wherein the base member having the first rigid region and the second elastic region includes two discrete injection-molded components.

19. The installation device as recited in claim 5, wherein:

the first rigid region of the base member includes a sensor receptacle, the at least one holding bracket, and the at least one tab;

the sensor receptacle and the at least one holding bracket accommodate the sensor;

the at least one tab is introduced and fixed in the contour ring;

the second elastic region includes the at least one spring element; and the first rigid region and the second elastic region are joined via at least one connecting segment.

20. The installation device as recited in claim 5, wherein the contour ring is introduced from outside into the opening of the component.

* * * * *